United States Patent [19]

Glibbery

[11] Patent Number: 5,661,384
[45] Date of Patent: Aug. 26, 1997

[54] MOTOR CONTROL SYSTEM AND METHOD

[75] Inventor: Irwin A. Glibbery, Upland, Calif.

[73] Assignee: Lucas Western, Inc., Brea, Calif.

[21] Appl. No.: 460,857

[22] Filed: Jun. 5, 1995

[51] Int. Cl.$^6$ .................................................. G05B 5/00
[52] U.S. Cl. ...................... 318/471; 318/472; 388/934; 361/24; 160/309
[58] Field of Search ........................ 318/471, 445, 318/456, 472, 473, 565, 783, 798–815, 434; 388/934; 198/418; 307/112, 139; 361/24, 25; 49/26, 31; 160/309–310

[56] References Cited

U.S. PATENT DOCUMENTS

| | | | |
|---|---|---|---|
| 3,698,539 | 10/1972 | Schwarbeck | 198/418 X |
| 3,976,925 | 8/1976 | Rudich, Jr. | 318/783 X |
| 4,070,610 | 1/1978 | Rudich, Jr. | 318/783 X |
| 4,525,763 | 6/1985 | Hardy et al. | 318/471 X |
| 4,611,682 | 9/1986 | Yasuda et al. | 318/473 X |
| 4,673,031 | 6/1987 | Wiemer | 318/783 X |

*Primary Examiner*—Karen Masih
*Attorney, Agent, or Firm*—Pretty, Schroeder, Brueggemann & Clark

[57] ABSTRACT

This disclosure provides a motor control system and method that is preferably applied to cargo power drive units. Power is supplied to a motor having one or more windings and a thermocouple that is embedded in the motor windings. The thermocouple provides an electronic signal from which both motor temperature and rate of temperature change are derived. A motor control circuit uses these values to determine if a jam condition has occurred (as represented by improper temperature rise) or whether critical overheating is occurring. If so, the motor control circuit causes a power switch to disconnect power from one or more PDUs in the subject bank of PDUs. Power is temporarily disabled, until a cargo operator releases a joy stick control to a neutral position and then attempts to use it again.

13 Claims, 9 Drawing Sheets

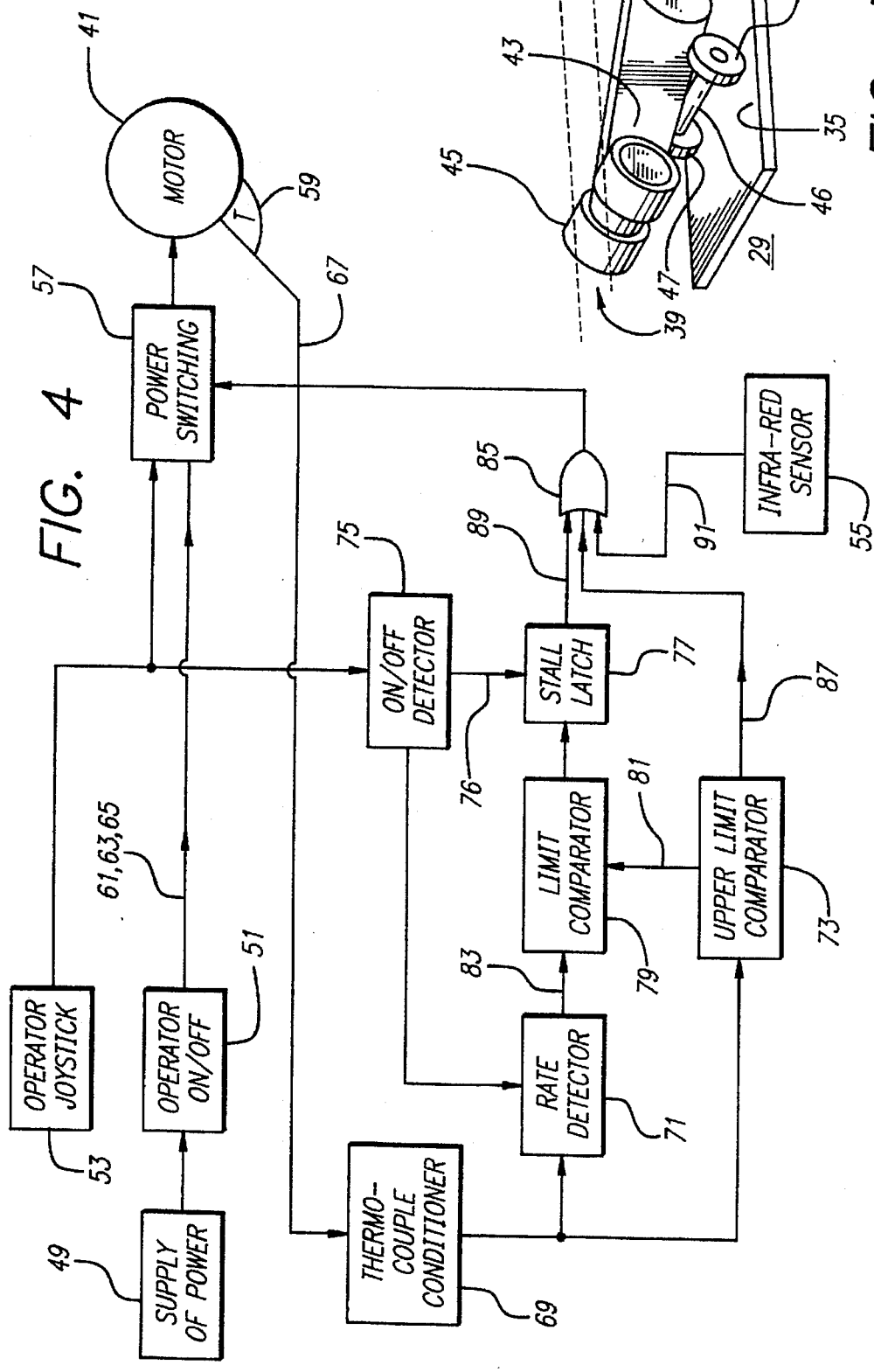

MOTOR CONTROL SYSTEM AND METHOD

The present invention relates to a motor control system and related method. More particularly, it provides a circuit that monitors motor temperature and limits power supplied to the motor in direct response to the motor temperature and/or motor temperature change.

BACKGROUND

Electric motors are used in many, many applications. They generally operate by harnessing magnetism to rotate an output shaft in response to electricity. Typically, this is done by providing one or more wires (i.e., "windings") with electric power, which are configured within the motor in a way that causes the rotation.

No matter the application, a common danger to motor life is motor overheating. This can be caused by jamming or stalling of the motor, where its output shaft is prevented from freely-rotating. While some amount of loading on the motor's output shaft always occurs, significantly so when the motor is performing heavy work, if the loading is large enough, the windings can be caused to catastrophically overheat and damage the motor. Thus, no matter the type of product or machinery, if it has a motor, motor overheating can be a significant limit to product's or machinery's useful life.

"Cargo Power Drive Units," or "cargo PDUs," are one particular application of an electric motor, and are located within the belly of an aircraft. In PDU applications, cargo is normally supported by a system of freely rotating bearings, as shown in FIGS. 1 and 2. This bearing structure that enables the cargo to be easily pushed within the aircraft to its intended position. Individual PDUs are mounted within the floor of an aircraft cargo bay, and each has its own motor and rubberized roller. When turned on, sets or banks of individual PDUs are commonly elevated from beneath the floor to just above the bearings, to propel cargo while it is supported by the bearings. This enables the cargo to be mechanically positioned by a single operator, without requiring extensive manual labor.

Each of several sets of PDUs are arranged along a path of conveyance, and each set consists of several aligned PDUs which are driven in common. That is, an operator manipulating the PDU controls (which consist essentially of an on/off switch and a joy stick) will cause all of the PDUs in a given set to lift and rotate in the same direction at the same time. This enables the operator to simultaneously move more than one piece of cargo within the aircraft. In the system shown in FIGS. 1-2, there are five sets of cargo PDUs: Front section left and right track sets 13, 15, rear (kink) section left and right track sets 17, 19, and a lateral set 21 positioned at the cargo bay door 23 that connects left and right tracks at the front/rear section junction.

The problem of motor overheating, discussed just above, can be a serious limitation on the effective life of PDUs. For example, as there are typically numerous pieces of cargo to be stowed within the aircraft, several pieces are typically simultaneously moved by one energized set of cargo PDUs. However, a first piece of cargo reaching the end of the aircraft will be blocked, and unable to move further, while the entire set of energized cargo PDUs continues to rotate in elevated condition and propel the remainder of the cargo along the length of the aircraft. The rollers underneath stopped cargo thereby abrasively "scrub" the bottom of the cargo, if it is light, and causes damage to the cargo and wear to the PDU wheel or roller. In the case of heavier cargo, this jamming can also cause the PDU motors to overheat and burn out.

The problem of motor overheating is by no means limited to the environment of PDUs; it is significant generally whenever motors are used.

Solutions to motor overheating have traditionally relied upon use of either a bi-metal switch or a fuse. These elements are placed in line with the motor's supply of electricity, and are triggered when the amount of current drawn by the motor increases above a predetermined amount. Use of these elements alone does not provide an ideal solution to all motor overheating problems, however.

For example, fuses and bi-metal switches have serious life and repeatability problems. It is generally necessary to replace the fuse or reset the bi-metal switch each time they are triggered, which can be labor intensive, particularly so where multiple switches or fuses are utilized. Frequent resetting of bi-metal switches imposes a limited life on the switch and subjects it to progressive deterioration.

Also, there is usually a time lag between an increase in motor temperature and the cutting-off of motor power by the bi-metal switch or fuse, and these elements do not always function correctly. Under conditions of jamming, where motor temperature can rise very quickly, motors still can experience damage.

Further still, the use of fuses and bi-metal switches do not provide flexibility, because they only are affected by current, which is not necessarily the same thing as motor temperature. For example, in applications where a three-phase motor is used, currents of three different phases are supplied to supplied to three different windings of the same motor. In such systems, motor faults besides jamming can cause overheating, but these faults sometimes cannot readily be distinguished from jamming using bi-metal switches and fuses; bi-metal switches and fuses are triggered by a rise in current fed to motor, but not by other changes in current consumption that might reflect motor faults other than severe strain. It would be useful to have a motor control system that distinguishes a system malfunction, such as degradation of one of the windings, from a jammed, overheating motor. This would permit quick replacement of a malfunctioning motor.

There has existed a definite need for a motor control system that instantaneously detects motor overheating and turns off the supply of power to the motor. What is needed is a system that can be repeatedly used without degradation, thereby further improving the effective life of the system. Further, there has also existed a need for a system that can detect motor jamming and distinguish jamming from other types of motor faults. The present invention solves these needs and provides further, related advantages.

SUMMARY OF THE INVENTION

The present invention solves the foregoing needs by providing a motor control system that directly measures and electronically monitors motor temperature. Thus, the present invention permits close monitoring and reaction to motor behavior, and enables a motor's power supply to be closely regulated for desired performance. For example, a specific application using the present invention can be tailored to cut-off or limit motor power if the motor experiences a predetermined load; alternatively, the invention can be used with an indicator that informs an operator when a motor is "bad," that is, when its heating characteristics represent a technical failure, as opposed to loading. Using the present invention permits motor power to be regulated in any desired manner, as a function of temperature.

One form of the invention provides a motor control system that regulates supply of power to a motor in response to temperature. To achieve this, a sensor measures motor temperature and provides an electronic output representing that temperature. This output is provided to a motor control circuit which monitors the motor temperature to determine if the supply of power to the motor should be limited.

In one feature of the invention, the motor control circuit compares absolute motor temperature with a reference rate and activates switching if motor temperature gets too hot. Alternatively, in another feature of the invention, the motor control circuit can be used to determine a rate of actual temperature change and to compare it with a reference rate; if the motor temperature rises too quickly, a condition commonly associated with jamming, then motor power can be limited. These two features can be used together to provide nearly any desired scheme of motor monitoring and control using temperature, such as sensing specific ranges of temperature change, and implementing sophisticated control. In the preferred case of a PDU system aboard aircraft, discussed below, both features are used to achieve simple control; when a jam (a sharp rise in temperature) or critical overheating is detected, motor power is completely cut-off until the operator releases his joy stick, and then begins using it again.

Another form of the invention provides a method of controlling a power drive unit located within a cargo bay. According to this method, the power drive unit includes a motor that rotates a drive roller to move cargo. Once power is connected to the motor, motor temperature is sensed using the sensor, which outputs an electronic signal. This signal is represents temperature, e.g., it indicates motor temperature, motor temperature change, or some other related quantity. The output is compared to a predetermined state, to determine whether motor temperature or motor temperature change matches the predetermined state. If so, then power is limited to the motor in a predetermined amount.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 5(2) is the second half of the first page of FIG. 5(1).

FIG. 6(2) is the second half of the second page of FIG. 6(1).

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a motor control system and method, namely, a motor control system and method that monitor temperature of a PDU motor to prevent against overheating. The invention, however, may also be applied to other types of systems as well.

I. Introduction To The PDU Environment

The preferred embodiment of the present invention is explained with reference to the accompanying FIGS. 1-5. FIG. 2 shows a generally H-shaped conveyance surface 26 mounted in the lower deck of an aircraft, and a cargo bay loading door 23. It is emphasized that there are many dozens of aircraft cargo deck configurations. Some aircraft, particularly configured for cargo, feature the upper passenger deck removed within an additional larger cargo deck installed. Other aircraft may feature three or more longitudinal tracks rather than the H-shape shown above. The preferred motor control system described below applies to every such conveyance system.

Figure 1:
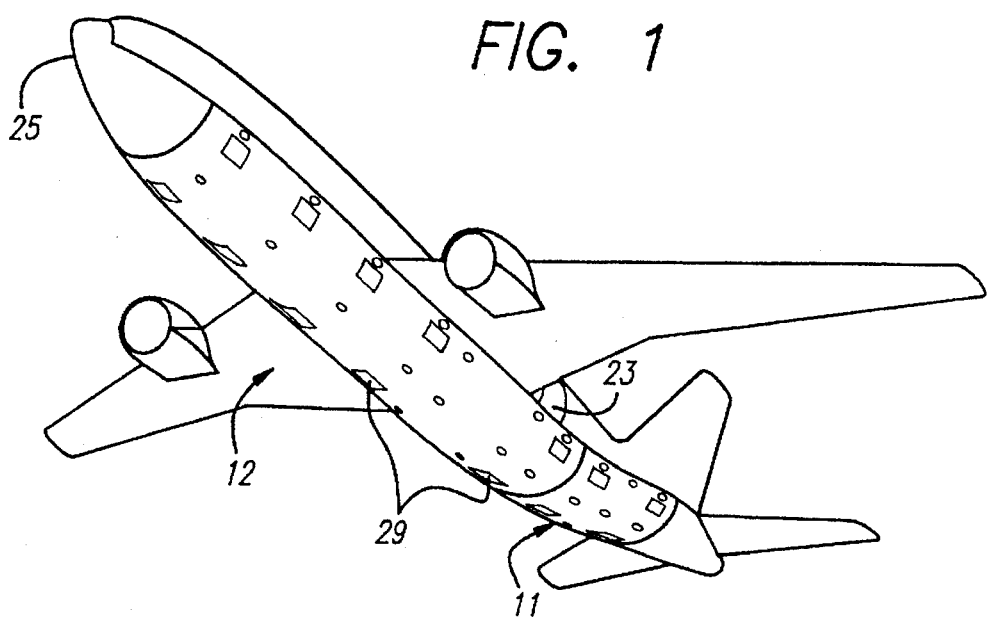
FIG. 1 shows an illustrative view of an aircraft having a lower deck cargo system which embodies the principles of the current invention.
Figure 2:
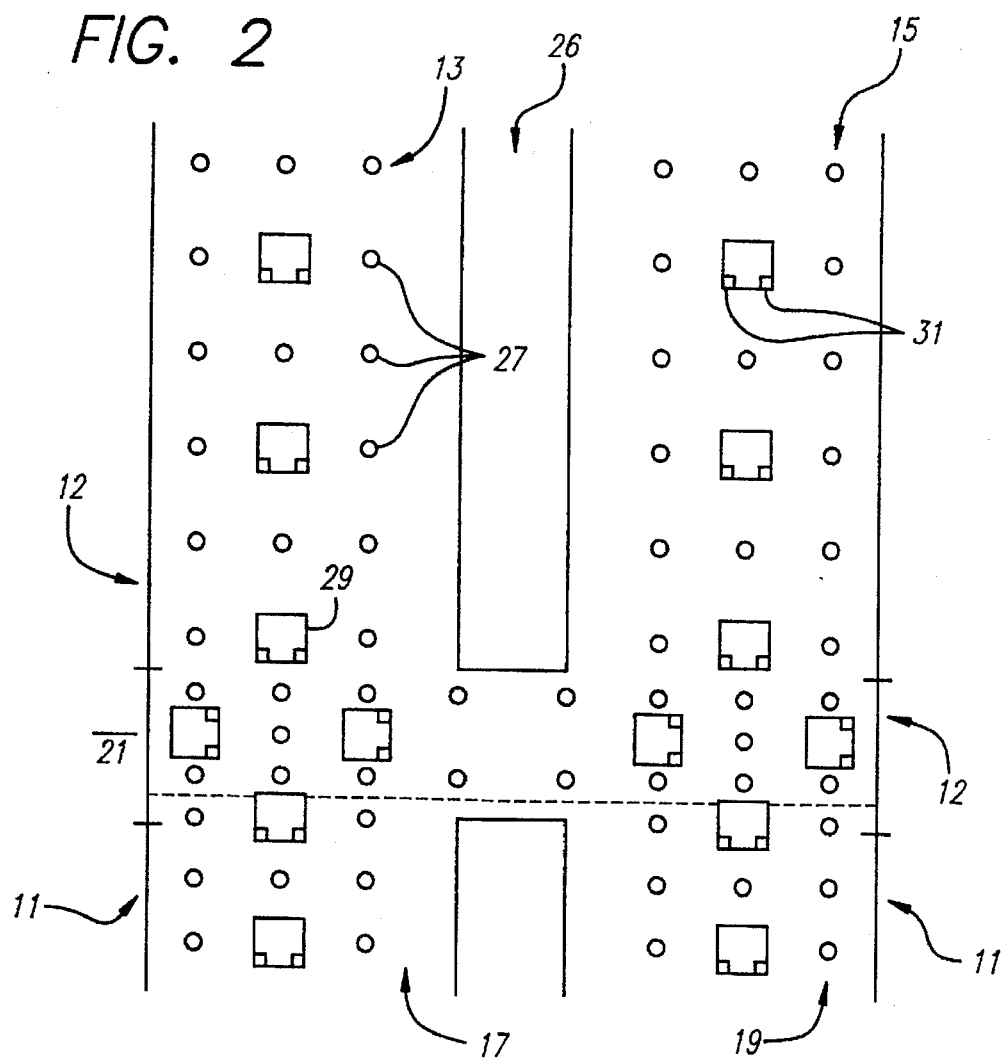
FIG. 2 shows a plan view of a portion of the cargo system shown in FIG. 1, including five sets of drive units and freely-rotating support bearings that support loads and pallets conveyed by the cargo system.

As shown in FIGS. 1 and 2, the H-shaped cargo surface includes a system of freely rotating bearings 27 which are mounted in the cargo deck. Under normal conditions, cargo loaded into the aircraft may be easily manually moved throughout the cargo bay upon this system of freely rotating bearings. However, it is desirable to electro-mechanically propel these loads with minimal manual assistance.

To this end, the H-shaped cargo surface includes a number of power drive units, or "PDUs" 29, that assist the bearing support structure in supporting the cargo, and propel the cargo over the bearing support structure as directed by a human operator. Each PDU typically includes a roller element 31 which is raised from a normal position beneath the cargo deck up to a rotating elevated position. In this position, it contacts and drives overlying cargo that ride upon the bearing support structure.

These days, PDUs are typically rectangular with a translatable frame that mounts both the electric motor and roller element 31. Examples of such PDUs may be observed in more detail by reference to U.S. Pat. Nos. 3,690,440, 3,698, 539, 3,737,022, 3,565,233, 3,613,852, 3,631,934, 3,741,504, 4,697,694, and 4,792,037. It is emphasized, however, that the PDUs referred to herein may include any device typically used to propel cargo on a conveyance surface, and may include, for example, conveyor belts and other cargo-propelling devices. The basic structure and operation of the PDUs preferably utilized will be elaborated upon below.

The illustrated H-shaped conveyance surface 27 includes two tracks, a left track and a right track, along which cargo is to be stowed in parallel for aircraft flight. As the aircraft fuselage narrows at the aircraft's tail, the cargo deck is also separated into a tail section 11 and a main section 12, with the tail section being tilted slightly upwards to provide for additional cargo storage space as the airplane's fuselage tapers at the tail. Thus, the left and right tracks are divided into four sections, two forward 13 and 15 and two aft 17 and 19. In the example shown in FIG. 1, the tail section 11 of the cargo bay is tilted upwards from the main section 12 of the cargo bay towards the tail at an angle of 1½ degrees. In addition to the four sections just described (the left and right main sections 13 and 15, and left and right tail sections 17 and 19), there is an additional path 21 between both tracks at the cargo door 23, at the junction of the tail and main sections 11 and 12. This lateral path is used to move cargo into and out of the aircraft, and also to transfer cargo between the left and right storage tracks.

The manipulation of cargo into and within the aircraft 25 may be controlled by a single human operator, who manipulates operator controls to control the energization of power drive units 29 among the five aforementioned sections 13, 15, 17, 19 and 21. Typically, these controls 33 are mounted in a hand-held pendant unit connected to a PDU power relay box by a cable. Alternatively, the control elements may be mounted to a wall or other structure within the cargo bay. These controls will usually have an on/off switch and a joy stick which, depending upon the direction pushed, will momentarily energize a set of PDUs 13, 15, 17, 19 or 21, causing groups of roller elements 31 to be elevated and rotated in one or two possible directions. By "momentarily energize", it is meant that a section of PDUs will remain energized as long as the joy stick is held in a certain position. When the joy stick is released, the set of PDUs selected are de-energized and return their roller elements to their normal position below the plane of the load's conveyance.

Figures 1, 5:
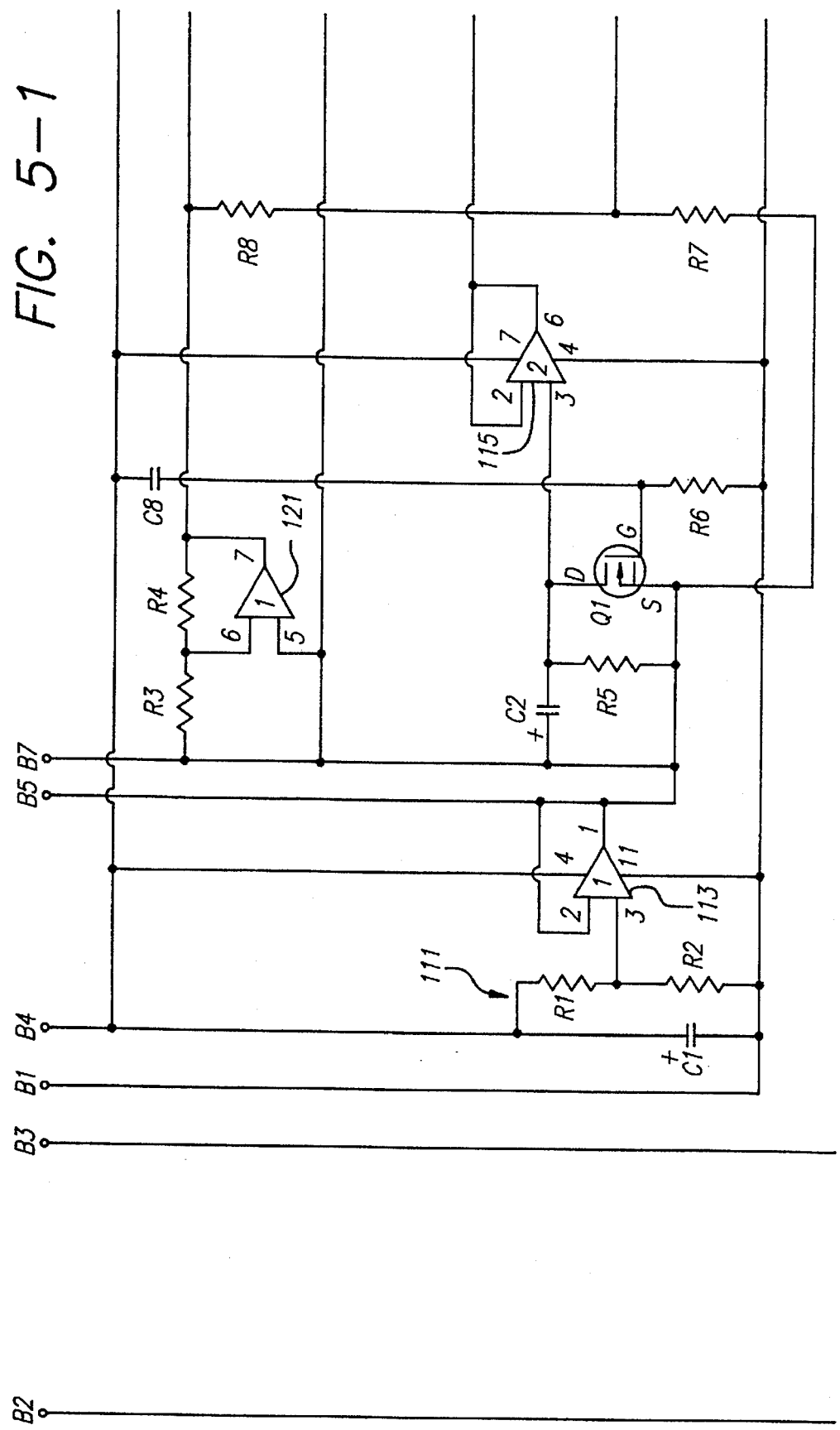
FIG. 5(1) is the first half of a first page of a schematic diagram of the preferred PDU motor control system.
Figures 2, 5:
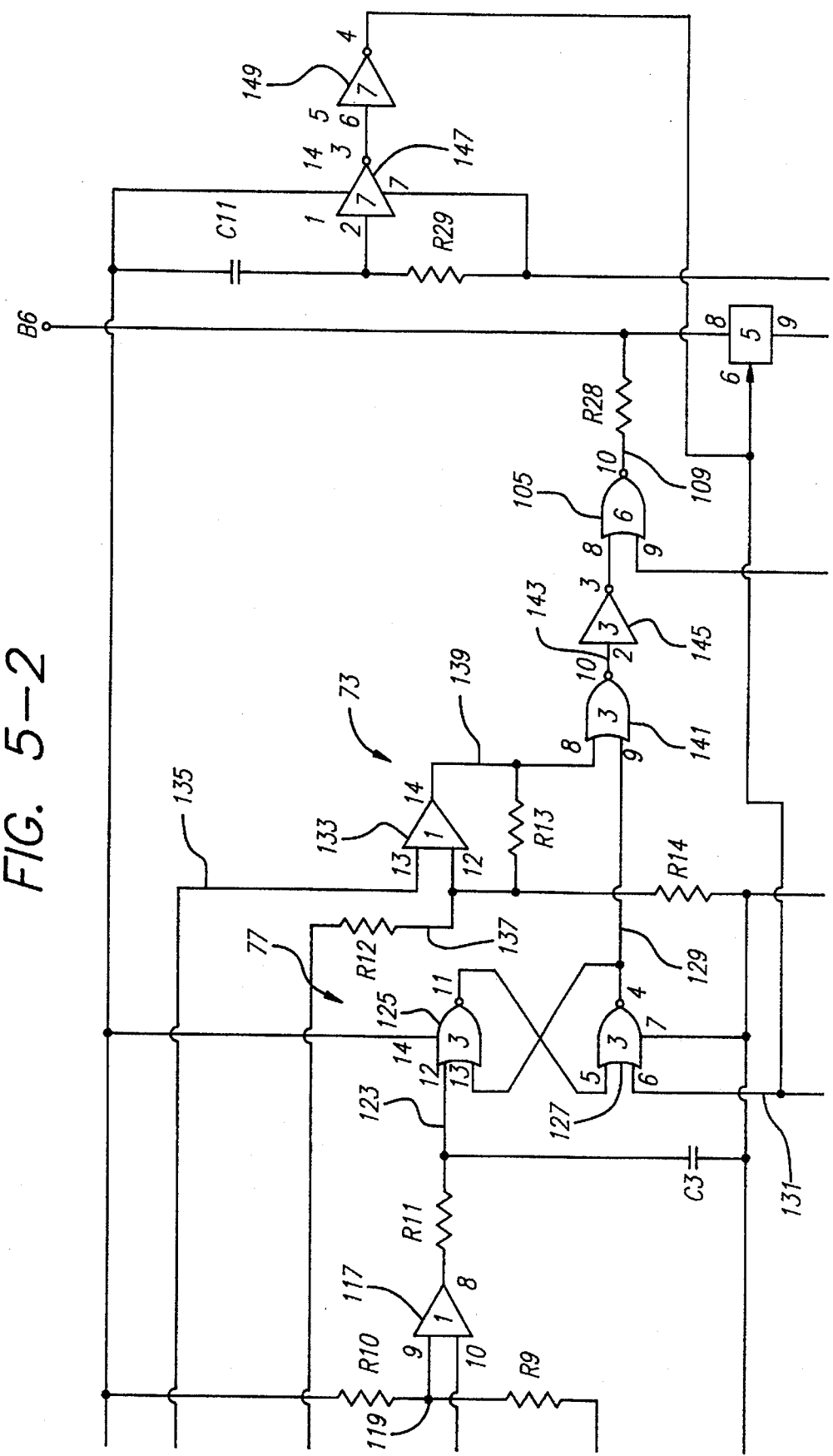
Figures 3, 5:
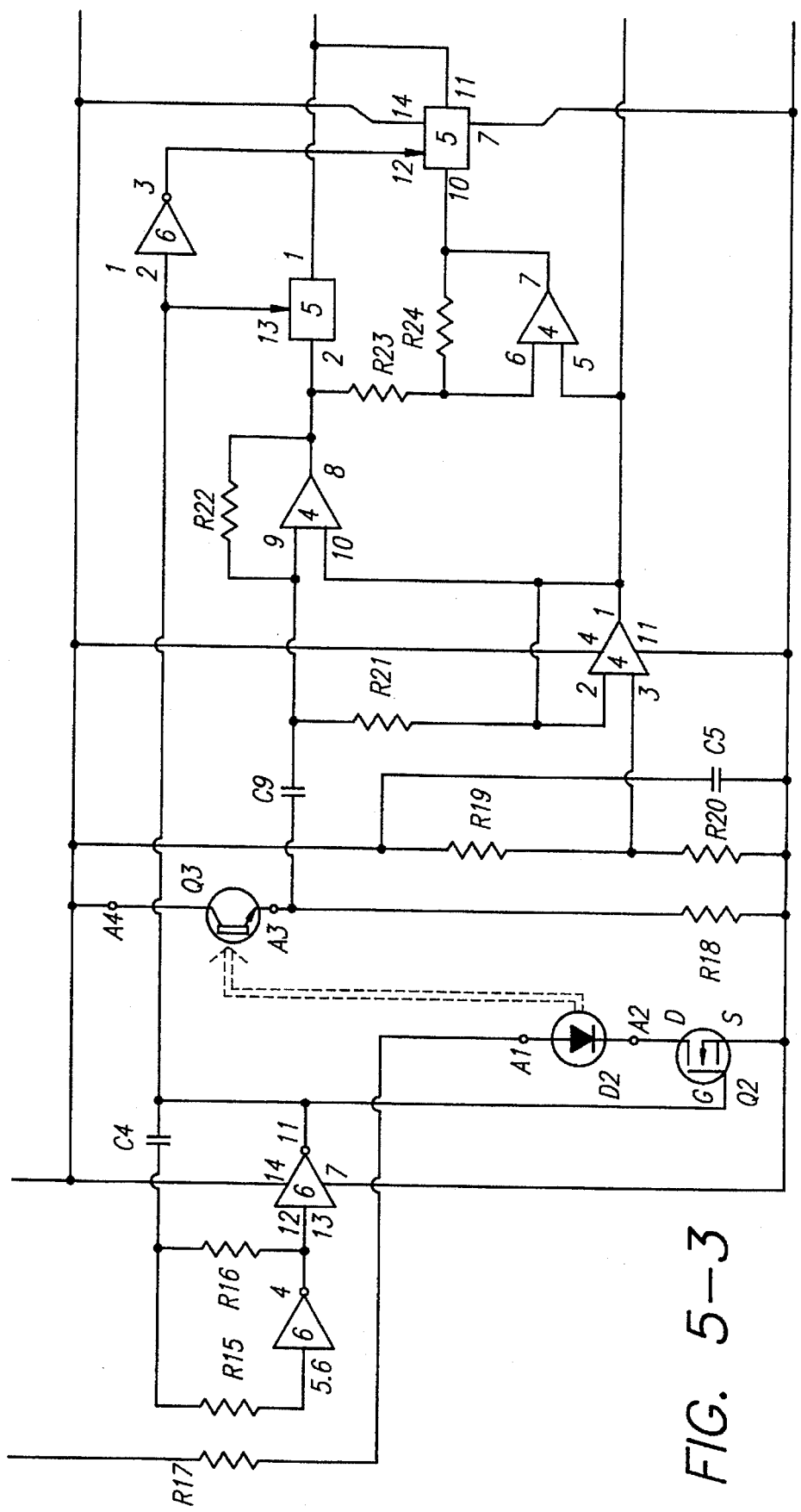
FIG. 3 shows an illustrative view of a particular type of PDU utilized in the cargo system shown in FIGS. 1 and 2, namely, a "self-energizing" PDU, where one motor only both raises the PDU roller and rotates it to propel cargo.

As seen in FIG. 3, a typical PDU 29 includes a base 35, which is mounted to the aircraft 25 below the conveyance plane, and a translatable frame 37, which is pivoted upon an axis such that a swinging end 39 is elevated towards the cargo deck and the plane of conveyance 40. The translatable frame carries on it a motor 41, reduction gearing 43, a roller element 45 for contacting and propelling the load, and a cam element 47 for causing the frame's translation towards the plane of conveyance.

When energized with a three-phase, four-hundred hertz, two-hundred volt power supply 49, each PDU's motor 41 begins to pass torque to a reduction gearing 43. The direction of motor rotation is dependent upon the relative phases of the power supplied, as will be explained below with reference to FIGS. 5 and 6. If it is desired to rotate the motor 41 in reverse fashion, two of three phased voltage supply lines 61, 63, and 65 are interchanged to reverse the power supply's influence upon the motor 41. In most PDU configurations, a maximum 200 volt line-to-line voltage is always applied during active driving to the drive motor 41.

The torque provided to the roller element 45 by the reduction gearing 43 is simultaneously applied to a rockable shaft 46 on which a cam element 47 rides. The roller element 45 is fitted with a viscous drag 48 that impedes the roller element's rotation. As a result, the motor's torque is passed almost entirely to the rockable shaft 46, causing the cam element 47 to rotate, and to translate the frame 37 towards the conveyance plane. The PDUs 29 are mounted close enough to the plane of conveyance that very little translation is needed to bring the roller element 45 to a position where it may contact the cargo.

When the roller element 45 has been elevated to contact a heavy piece of cargo, or when the swinging end 39 has reached the highest point it is permitted to travel, the resistance to translation becomes greater than the resistance to the roller element's rotation, and the motor's torque is passed to the roller element 45 to cause it to rotate. Because of the gearing configuration, the roller element will rotate in one of two directions depending upon the direction of motor shaft rotation.

PDUs 29 are typically 4-inch wide rectangular trays that may be easily mounted within the aircraft cargo deck and do not require great depth. They may thus be easily removed for maintenance.

II. The Preferred Motor Control System

A. Overview

Figures 4, 5:
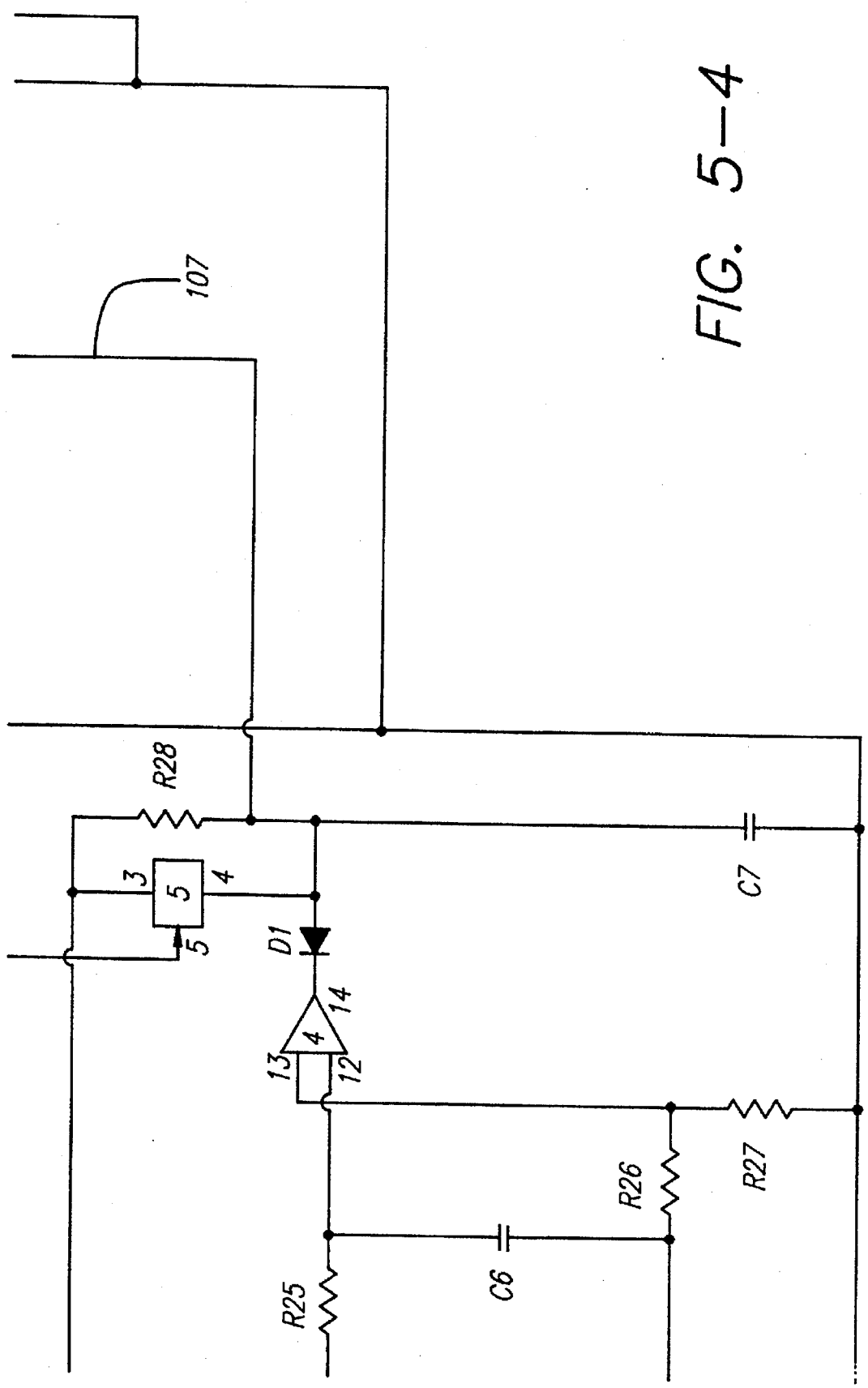
FIG. 4 shows a block diagram of the preferred motor control system, which is built according to the present invention; this specific embodiment monitors motor performance by comparing motor temperature with an upper temperature limit, and also by comparing a rate of temperature change with a predetermined rate.
Figures 1, 6:
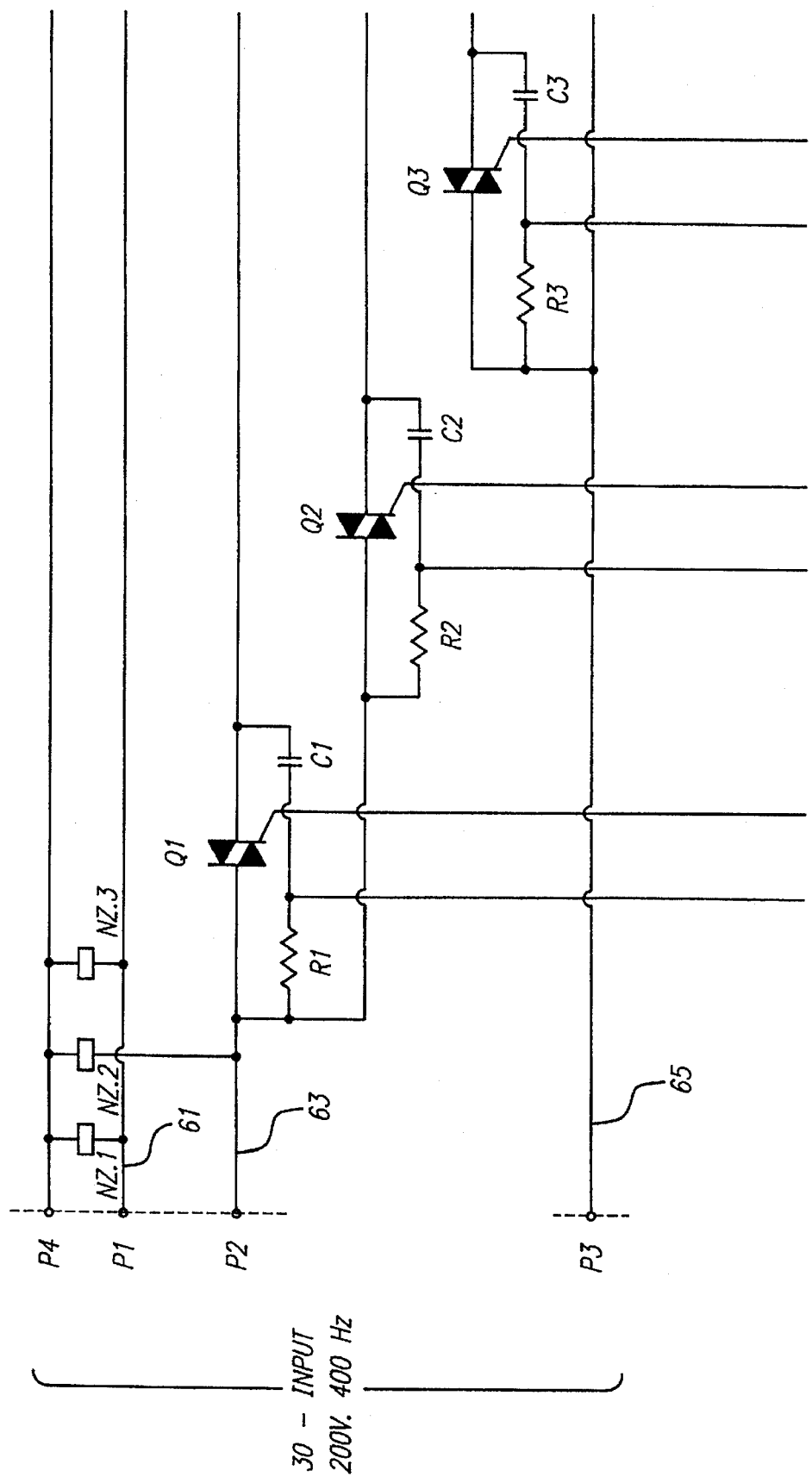
FIG. 6(1) is the first half of a second page of the schematic diagram of the preferred PDU motor control system.
Figures 2, 6:
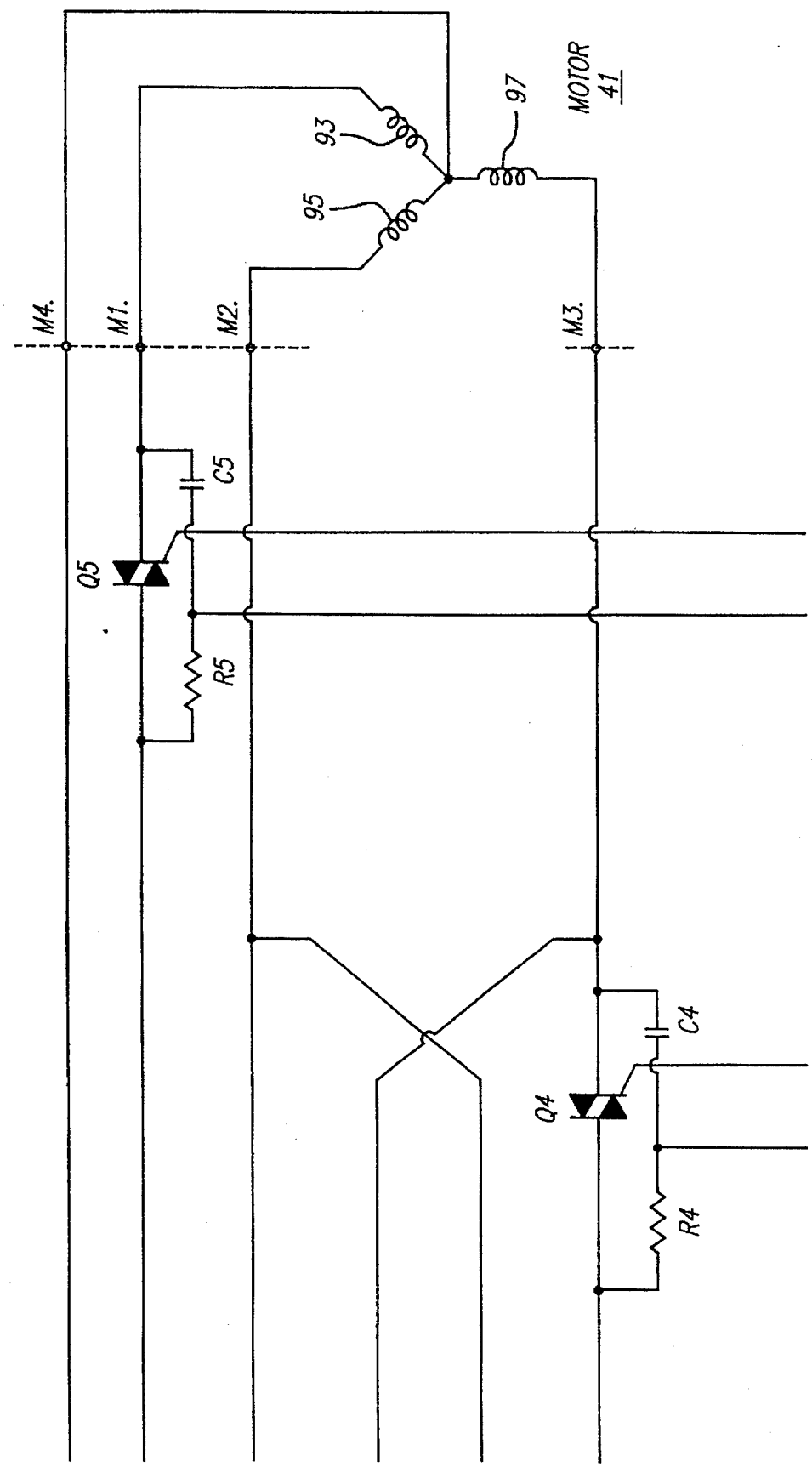
Figures 3, 6:
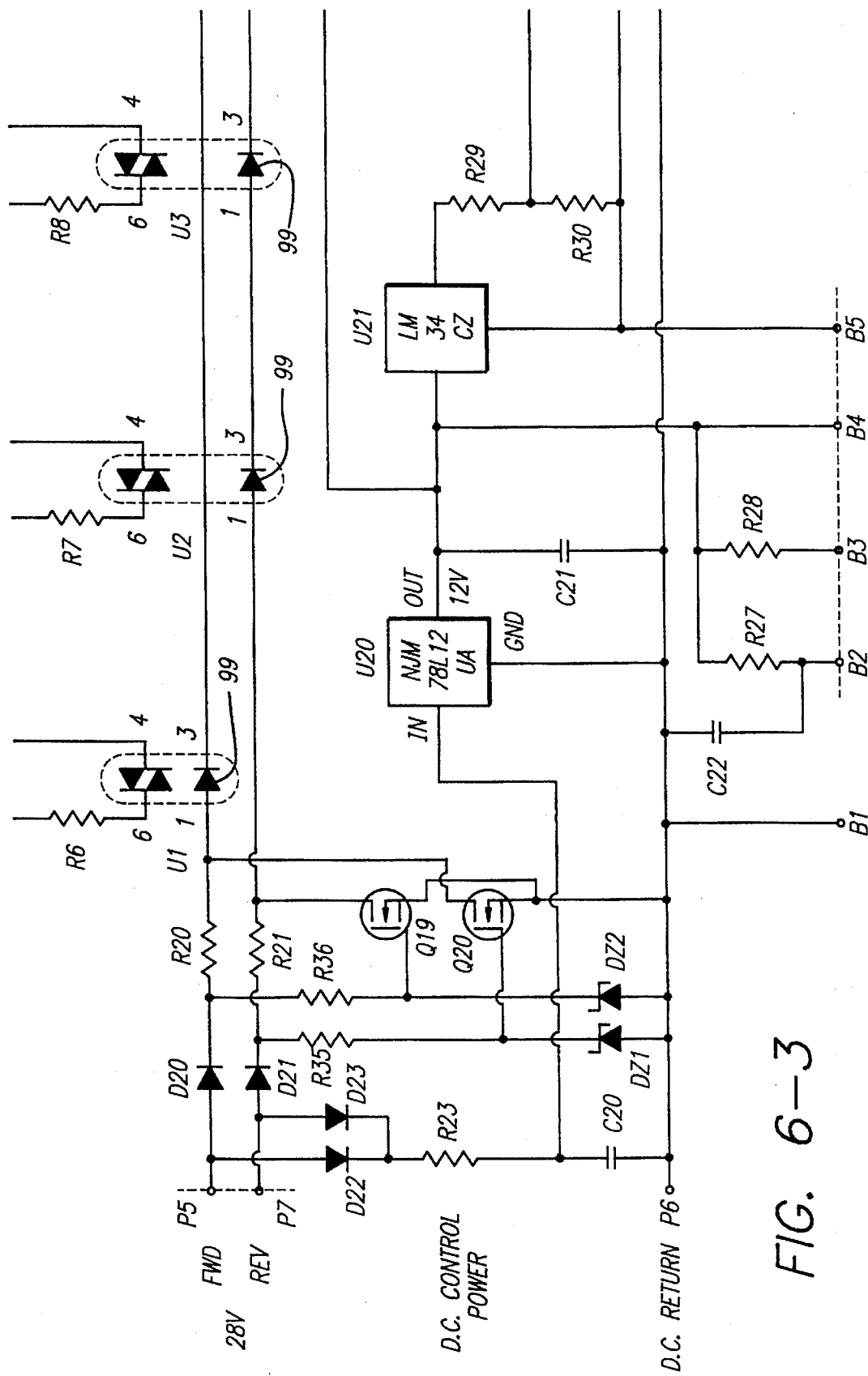

FIGS. 4–6 illustrate the preferred motor control system which implements the present invention. Preferably, each PDU 29 includes circuitry (FIGS. 5 and 6) which regulates the power supplied to the PDU. Accordingly, should any one PDU 29 in a bank of PDUs 13, 15, 17, 19 or 21 fail, that failure does not inhibit operation of other PDUs in the particular bank. To begin operation of the PDUs 29, the operator turns an "on" switch 51 which couples power to each PDU 29. However, the PDU motors are not connected to the three-phase power until two conditions exist: (1) The operator uses his joy stick 53 to indicate a forward or reverse direction; and (2) an infra-red sensor 55 in each PDU detects the presence of cargo directly above that PDU.

FIG. 4 is a block diagram that indicates operation of each PDU's motor control system. As seen in FIG. 4, the supply of power 49 and the motor 41 are connected together by three power lines 61, 63 and 65, and also by a system ground connection. Between the motor 41 and the supply of power 49 is electronic power switching 57 that has at least two positions to regulate power to the motor. In the preferred PDU implementation, this switching 57 can (1) couple all three power lines to the PDU, (2) disconnect all three power lines, and (3) interchange two of the three power lines to cause reverse rotation of the motor. Control over the switching comes from an electronic control circuit and from the operator joy stick 53 that directs operation of the particular PDU.

The operator joy stick 53 can supply a forward direction signal, a rearward direction signal or no direction signal at all. If a forward direction signal is supplied from the operator joy stick 53, the three power lines are directly connected to the PDU. If the rearward direction signal is provided to the power switching, the switching 57 connects the power lines to the PDU, but two of the three phases of power are interchanged, to cause the motor to rotate in the reverse rotational sense. If no signal is supplied to the power switching 57, none of the power lines are connected to the PDU motor 41. [The power for the control logic is derived from the forward and reverse signal lines. Hence, if neither directional signal is supplied, the logic circuits and power switching are basically turned "off."]

As indicated by FIG. 4, a thermocouple 59 is embedded in the motor 41 to directly sense the temperature of the motor and provide an electronic indication 67 which is proportional to that temperature. The electronic indication 67 is sent to thermocouple conditioner circuitry 69, which amplifies the electronic indication and passes it both to rate detector circuitry 71 and an upper limit comparator 73. The purpose of the rate detector circuitry 71 is to detect a rate of upward temperature change and account for transient power effects, and the purpose of the upper limit comparator 73 is to compare absolute motor temperature with a predetermined limit, namely, 350 degrees, to sense critical motor overheating.

One function of the rate detector circuitry 71 is understood by noting that the rate of motor temperature change, and whether that change represents motor jamming or a near-stall condition, is dependent upon the initial temperature of the motor 41. For example, when the PDU is first energized, the rate of temperature change can be very significant, and the motor will very quickly reach temperatures of about 150 degrees fahrenheit. It is desirable to separate acceptable temperature rises of this nature that are characterized, within this disclosure, as a fault condition, and to distinguish them from a jam or other near-stall condition. Accordingly, the rate detector circuitry 71 includes a number of solid state elements which minimize the effect of transient conditions and which must be initialized when power is first applied. Since power for the logic circuits is derived directly from the forward and reverse direction signals from the operator joy stick 53, these signals are used by on/off detector circuitry 75 to provide initialization signals to the rate detector circuitry.

In addition to performing this function, the on/off detector circuitry 75 also resets a stall latch 77. The stall latch 77 is triggered to interrupt motor power any time motor temperature change is excessive, and motor power cannot be re-supplied to the motor until the operator relaxes the joy stick 53 to the neutral position, thereby removing the forward and reverse direction signals. When this is done, the system "presumes" that the jam or other condition has been corrected, and it uses the on/off detector circuitry 75 to provide a reset strobe signal 76 to the stall latch 77, permitting re-connecting of power to the motor 41.

A limit comparator 79 compares upward rates of temperature change with a reference rate, to determine when a temperature rise indicates jamming. To do this, the limit comparator 79 utilizes both of a signal 81 representing absolute temperature (obtained from the upper limit comparator) and the rate of motor temperature change 83. It is important to compensate for absolute temperature, because, as mentioned, when the PDU is first energized, it is not surprising that temperature of the PDU motor "jumps" about 15 degrees fahrenheit. A temperature jump of this magnitude would be considered a near-stall at 350 degrees. Accordingly, the rate of motor temperature change 83 is compared with a reference rate, which varies with absolute motor temperature, and the limit comparator 79 uses both of these to determine whether motor temperature change is improper. If temperature change is improper, the limit comparator 79 activates the stall latch 77, causing power to be removed from the PDU motor 41 until the operator joy stick 53 is released and re-engaged.

Finally, FIG. 4 indicates use of a three-input "OR" function 85 to cause the power switching to disconnect power from the motor. Two of the inputs to the "OR" function are, as just described, the output 87 of the upper limit comparator 73 (e.g., a "hot" signal), and the output 89 from the stall latch 77 (e.g., a "stall" signal). Power is disconnected from the PDU motor at times when either of these signals indicates that there is a problem.

However, as indicated above, the preferred system also uses infra-red detector circuitry 55 at each PDU to determine whether cargo overlies that PDU. To this effect, an electronic output 91 of the infra-red detector circuitry provides the third input of the "OR" function 85, such that the supply of power 49 is also disconnected from the PDU when there is no cargo that directly overlies that PDU. This feature is used as a power savings measure aboard the aircraft.

B. FIGS. 5 and 6; The Accompanying Schematics

1. External Connections and Connections Between Boards

With reference to FIGS. 5 and 6, the circuitry of the system just described will be explained in greater detail, with the exception that the precise operation of the infra-red sensor circuitry 55 will not be extensively described. The schematic for this latter circuit is seen in the lower half of FIG. 5, which indicates that a light emitting diode is used to sense the presence of cargo above each particular PDU. Design of appropriate infra-red sensor circuitry 55 is considered well within the skill of one familiar with electronics.

FIG. 6 indicates the power switching, on/off detector, thermocouple and thermocouple conditioning circuits of FIG. 4, as well as regulation of power to the logic of the circuits of FIGS. 5 and 6. By contrast, FIG. 5 includes the circuitry of FIG. 4 that monitors temperature and temperature change and the infra-red sensor circuitry 55. Each of FIGS. 5 and 6 represent separate electronics boards, and there are a number of interconnections between the two boards, as well as other elements. These interconnections are described first, to assist the reader with the description that follows.

With reference first to FIG. 6, connectors P1–P7 originate outside of the two boards and represent control of the PDU, supplied from the supply of power 49, the operator on/off switch 51, and the operator joy stick 53. They include: P1–P4, which represent the three phases of power 61, 63 and 65 and ground, respectively; P5, which carries the forward direction signal from the operator joy stick 53; and, P7, which provides the rearward direction signal from the operator joy stick. Signal P6 is the DC return line for the control electronics, which is used as the system ground. The power lines, P1–P3, are coupled into the board for switching and output (via M1–M3) to three motor windings 93, 95 and 97.

On a PDU side of the two boards, four outputs, M1–M4, provide power and ground to the PDU motor, and two inputs, T1 and T2, are received from the motor-embedded thermocouple 59. These inputs T1 and T2 are provided to the thermocouple power conditioner circuitry, found in FIGS. 5(2) and 6(1).

Finally, connectors B1–B7 provide inter-connection between the two boards: B1 is the DC return line (ground) for the electronics, whereas B2–B4 provide isolated supplies of twelve volts DC; B5 provides a six volt power supply, generated by a voltage divider circuit 97 of FIG. 5(1); B7 is the electronic indication of motor temperature; and, B6 is the output of the "OR" function 85 of FIG. 4, which controls a field-effect transistor ("F.E.T.") Q21 in FIG. 6(2), to thereby enable and disable the power switching.

2. Power Switching And FIG. 6

FIGS. 6(1&2) can roughly be divided into an upper half and a lower half. The upper half includes the power switching, while the lower half includes power regulation for the logic elements of FIGS. 5(1&2) and 6(1&2) and thermocouple conditioning circuitry.

With reference to FIG. 6(1), the three high-power lines 61, 63 and 65 used to drive the PDU motor are received by the board via connectors P1, P2, and P3. These inputs represent the three power phases and are passed through a set of five opto-isolators, which are respectively labeled U1, U2, U3, U4, and U5. These opto-isolators perform the power switching, and together, they either block alternating current ("A.C."), pass that current, or interchange two (63 and 65) of the three power lines. Following these opto-isolators are the three power output connectors M1–M, which couple the three power lines 61, 63 and 65 to the motor. Each of the opto-isolators U1–U5 are autonyster-controlled, and each has a switching diode 99 that permits bi-directional current flow when current simultaneously passes through that switching diode 99. As indicated earlier, the opto-isolators are all turned "off" unless one of these direction signals is present, and no power is passed under this condition.

As seen at the left side of FIG. 6(1), off-board connectors P5 and P7 carry the cargo direction signals, forward and rearward, respectively, at times when they are generated by the operator joy stick. A set of diodes D22 and D23 and field effect transistors ("F.E.T.s") Q19 and Q20 are used to provide an exclusive-OR function, such that only one of the forward and rearward direction signals can be used at one time to drive the opto-isolators U1–U5.

The power switching operates as follows.

First, the switching diode 99 of opto-isolator circuit U5 is coupled to receive both of the signals P5 and P7, and in response to them gate the first power phase 61 to the motor. Accordingly, anytime either a forward or rearward direction signal is present and current is caused to flow through this switching diode, opto-isolator U5 will couple bi-directional current from input P1 to off-board connector M1.

Second, the second and third 63 and 65 of the three power lines are coupled to off-board connector M2 and M3, by opto-isolators U1 and U4, respectively, any time a forward direction signal is present and current flows through their switching diodes 99. Accordingly, in conjunction with opto-isolator U5, the forward direction signal is used to supply the three power lines 61, 63 and 65 directly to the motor windings 93, 95 and 97.

Finally, opto-isolators U2 and U3 are used in the alternative to opto-isolators U1 and U4, and are governed by the rearward direction signal. These opto-isolators U2 and U3 interchange the second and third lines 63 and 65 to connect them to off-board connectors M3 and M2 and motor windings 97 and 95, respectively. Accordingly, these latter opto-isolators U2 and U3 are activated only when current is permitted to flow through their corresponding switching diodes 99 via the rearward direction signal.

As seen at the bottom of FIG. 6(2), F.E.T. Q21 is coupled to receive current that flows through all five opto-isolators U1–U5. This transistor Q21 gates the flow of current from these circuits to the system ground, seen as DC return in FIG. 6(1), and associated with off-board connector P6. As a result, when the F.E.T. Q21 receives "low" voltage at its gate, it is turned "off," and no current will flow through any of the switching diodes 99. F.E.T. Q21 is controlled in this manner to turn the motor "off" in response to the three input "OR" function 85 of FIG. 4.

As seen at the lower right hand side of FIG. 6(2), the motor-embedded thermocouple 59 provides off-board connector inputs T1 and T2 to the board of FIGS. 6(1&2). These inputs carry the electronic indication 67 of motor temperature, which is conditioned by passing it through a series of inverting amplifiers of FIGS. 5(1&2) and 6(2). A first inverting amplifier 101 normalizes the electronic indication with respect to a cold junction reference voltage, provided by chip U21 [FIG. 6(1)]. Chip U21 operates on a six volt input which is generated by the circuit of FIG. 5(1) and provided to chip U21 via off-board connector B5. An output 103 of the first inverting amplifier 101 will consequently represent absolute motor temperature and will be provided to the temperature sensing circuits via off-board connector B7.

As a result, connector B7, both found at the bottom-right of FIG. 6(2), will carry the electronic representation of motor temperature to the temperature sensing circuits, while connector B6 will provide a command back to F.E.T. Q21 to selectively cut-off all power to the motor.

As seen at the left of FIG. 6(1), the remaining circuits of that board provide power regulation for the logic elements of the system. In particular, twenty-eight volt DC power is derived from the forward and rearward direction lines, as an energy savings measure. As indicated above, two F.E.T.s Q19 and Q20 provide an exclusive-OR function for the opto-isolators U1–U5, to selective interchange the second and third power phases. Consequently, current will appear on one of diodes D22 and D23 only. This current is passed through a low pass filter, formed by the impedance bridge of resistor R23 and capacitor C20, to a voltage regulator U20. This voltage regulator provides a twelve volt DC output that is used by the various logic elements of the system. Consequently, when neither of the forward and rearward direction signals are being generated, the logic circuits of the system are essentially inactive. The regulated twelve volt output of the voltage regulator U20 is supplied to the various circuits of FIGS. 5(1&2) in the form of isolated outputs B2, B3 and B4.

3. The Temperature Monitoring Circuits And FIG. 5

With reference to FIGS. 5(1&2), the temperature sensing circuits will be described in greater detail. FIGS. 5(1&2) are also generally divided into upper and lower halves, with the lower halves describing the infra-red sensor circuitry 55, alluded to previously.

The infra-red sensor is formed about a combination of current controlling diode D2 and switching transistor Q3. An output of the infra-red sensor is supplied to a two-input NOR gate 105, found at the right of FIG. 6(2). Accordingly, when this input 107 to the NOR gate provided by the infra-red sensor becomes "high," the output 109 of the NOR gate will become "low," thereby causing the switching F.E.T. Q21 of FIG. 6(2) to shut-off current flowing through the opto-isolators U1–U5, and to turn the PDU motor "off."

At the upper left side of FIG. 5(1) is a center tap 111, which is formed by a combination of capacitor C1 and a resistance bridge formed by resistors R1 and R2. These resistors are identical in value, such that they take the twelve volt input provided by inter-board connector B4 and supply a six volt output to a buffer circuit 113. This six volt output is used both by the cold junction circuit U21 of FIG. 6(2).

At the same time, the six volt reference is provided as a "source" input to switching transistor (F.E.T.) Q1, which also receives the conditioned thermocouple output at its "drain." A sharp positive temperature rise will be represented by the presence of a voltage across switching transistor Q1. Voltage proportional to such a sharp positive temperature rise is supplied to an input buffer 115, which serves to isolate these rate detecting elements of the system from the comparison and stall latch circuits which follow.

As seen in FIG. 5(2), the output of the rate detecting elements just described is supplied as one of two inputs of a comparator circuit 117, which compares voltage associated with a sharp temperature rise to a reference voltage input 119. This reference voltage is determined by the output of an inverting amplifier 121 [FIG. 5(1)] and the values of resistors R7, R8, R9 and R10. The result of these elements is a variable voltage reference will be supplied as the second input 119 to the comparator 117; since absolute motor temperature is represented at inter-board connector B7, the voltage appearing at the junction of resistors R7 and R9 will generally be inversely proportional to temperature. Thus, the reference found at the second input 119 will also be inversely proportional to temperature. As a result, the system is relatively insensitive to sharp temperature rises at low absolute motor temperature, but becomes increasing sensitive to positive temperature change at high temperatures of the PDU motor 41.

Although not used in the preferred PDU application, other designs will occur to those of ordinary skill in electronics, which can be used to affect nearly any temperature control or comparison desired. For example, in other motor applications, the temperature sensing circuits could be made sensitive to specific temperature changes, e.g., 250 degrees to 260 degrees, etcetera. Such uses will vary with the particular motor application.

As has been mentioned previously, it is expected that PDU motor temperature will be approximately 150° F. at times when the PDU is driving a relatively light load, although this temperature can increase to over 350° F. as a jam or near-stall condition is approached. For purposes of the preferred PDU embodiment, it is desired the various electronic components described be adjusted so that an output of the comparator is relatively sensitive to positive motor temperature increases when motor temperature reaches about 300° F. Selection of values for the resistors, capacitors and other elements described is believed to be well-within the ordinary skill of one familiar with electronics, and will vary with the particular application.

The output of the comparator 117 is passed through a low-pass filter, formed by the bridge of resistor R11 and capacitor C3, and is provided to an input 123 of the stall latch 77, which is formed by two NOR gates 125 and 129. Once triggered, the stall latch will provide an output 131 which remains "high" until the stall latch is reset via a second input 131 to the stall latch.

The upper limit comparator is centered around a comparator circuit 133 found in the upper portion of FIG. 5(2). As one of its two inputs 135 and 137, it uses the conditioned thermocouple signal provided by the inverting amplifier 121 [FIG. 5(1)] and the voltage provided by the bridge of resistors R12 and R14. The value of these resistors is selected such that the upper limit comparator will produce a "high" signal at times when motor temperature exceeds approximately 350° F. The output 139 of the upper limit comparator is supplied as an input to another two-input NOR gate 141. This latter NOR gate 141 also receives (as its second input) the output 129 from the stall latch 77. Accordingly, when either the upper limit (defined by resistance bridge of R12 and R14) or the reference temperature change rate is reached, the output 143 of the latter NOR gate will be dropped to a "low" output. This output is inverted by an inverting amplifier 145 and then provided as the second input to the first-mentioned NOR gate 105, which also receives the infra-red sensor signal 107 that indicates whether or not cargo is present.

The three input "OR" function of FIG. 4 is thus formed by the combination of the two NOR gates 105 and 141 and the inverting amplifier 145. The circuit of FIG. 5(2) will provide off-board connector B6 with a "low" voltage when any of the following conditions occur: (A) The infra-red sensor circuitry 55 fails to detect cargo above the PDU; (b) The stall latch 77 is triggered by a sharp temperature rise, in reference to absolute temperature; and (c) The upper temperature limit defined by resistance bridge (of R12 and R14) is exceeded by absolute motor temperature. When any of these conditions exist, F.E.T. Q21 will be turned to a second position or "off," and power will be prevented from, or limited from reaching the motor. Otherwise, the F.E.T. Q21 is maintained in a first position where power reaches the motor.

Finally, as seen at the right portion of FIG. 5(2) a pair of logic gates 147 and 149 is used to generate a strobe output anytime power is turned off and then reapplied. As mentioned previously, this occurs when the operator releases his joy stick 53 to a neutral position, and then, re-uses it in an attempt to cause the PDU to move cargo in the forward or rearward directions. This strobe output is used as the second input 131, or reset indicator, to the stall latch.

Accordingly, what has been described is a specific embodiment of a motor control system that electronically monitors motor temperature and compares it with a reference to determine if the motor is operating properly. If the motor is not, the system can limit power to the motor; in the preferred embodiment just described, this power regulation is achieved by completely cutting off all power to the motor, but it does not necessarily have to be case, depending upon the particular application.

Having thus described an exemplary embodiment of the invention, it will be apparent that further alterations, modifications, and improvements will also occur to those skilled in the art. Further, it will be apparent that the present invention is not limited to use of a sound system in amusement park vehicles. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

I claim:

1. A motor control system, comprising:

a supply of power;

a motor;

a sensor mounted proximate to the motor that senses motor temperature and provides an electronic output indicating the motor temperature;

switching connecting the supply of power to the motor, the switching movable between a first position, wherein it couples power to the motor to drive the motor, and a second position, wherein it limits the drive of the motor relative to the first position; and a motor control circuit that receives the electronic output and causes the switching to move to the second position when the electronic output indicates a predetermined state;

wherein the predetermined state includes motor temperature change that is faster than a reference rate of temperature change; and wherein the motor control circuit includes:
a rate detector that receives the electronic output and detects a rate of motor temperature change;
a comparator circuit that compares the rate of motor temperature change with the reference rate; and
the motor control circuit causes the switching to move to the second position when the rate of motor temperature change exceeds the reference rate.

2. A system according to claim 1, wherein:

the predetermined state includes the condition of motor temperature that exceeds an upper limit;

the motor control circuit also includes a comparator circuit that compares motor temperature with the upper limit and indicates when motor temperature exceeds the upper limit; and the motor control circuit also causes the switching to move to the second position when motor temperature exceeds the upper limit.

3. A system according to claim 1, wherein the sensor is a motor embedded thermocouple that provides an analog voltage output that is proportional to motor temperature.

4. A system according to claim 1, wherein:

the motor control system forms part of a cargo conveyor;

the system further comprises a cargo detector that detects when cargo is in a position to be conveyed using the motor control system, the cargo detector having an electronic cargo detector output signal that indicates the presence of cargo at the position; and the switching is responsive to the electronic cargo detector output signal to cut-off power to the motor when cargo is not present at the position.

5. A motor control system, comprising:

a supply of power;

a motor;

temperature sensing means for sensing motor temperature and developing an electronic signal that represents at least one of motor temperature and motor temperature change; and a switching circuit that switches between:

a first position, wherein the switching circuit couples power to the motor, and a second position, wherein the switching circuit limits supply of power to the motor relative to the first position, wherein the switching circuit, in response to the electronic signal, switches from the first position to the second position when motor temperature matches a predetermined state, and wherein the predetermined state includes the condition of motor temperature change that exceeds a reference rate of temperature change; and the switching circuit includes:

rate detection means for detecting a rate of motor temperature change, the rate detection means operatively coupled to the temperature sensing means to receive the electronic signal, and comparison means for comparing the rate of motor temperature change with the reference rate and for causing the switching circuit to switch to the second position when the motor temperature change exceeds the reference rate.

6. A system according to claim 5, wherein:

the predetermined state includes the condition of exceeding an upper temperature limit;

the switching circuit includes limit sensing means for detecting when motor temperature exceeds the upper temperature limit, the limit sensing means operatively coupled to the temperature sensing means to receive the electronic signal; and the switching circuit is responsive to the limit sensing means to switch to the second position when motor temperature exceeds the upper temperature limit.

7. A method of controlling a power drive unit located within a cargo bay, the power drive unit including a drive roller, a motor that powers the drive roller to cause it to rotate and thereby move cargo, a sensor, and a motor control circuit that controls supply of power to the motor, the method comprising:

coupling power to the motor of the power drive unit;

sensing motor temperature using the sensor, and providing an electronic signal output indicative of at least one of motor temperature and motor temperature change;

comparing the output to a predetermined state, to determine whether one of temperature and temperature change matches the predetermined state, processing the output to determine a rate of motor temperature change;

limiting supply of power to the motor of the power drive unit when the predetermined state is matched; and wherein the predetermined state includes the condition of motor temperature change that exceeds predetermined temperature change, and:

wherein limiting the supply includes:

limiting the supply of power to the motor at times when the rate of motor temperature change exceeds a reference rate associated with the predetermined temperature change.

8. A method according to claim 7, wherein the predetermined state includes the condition of motor temperature exceeding an upper limit, and wherein:

limiting the supply includes limiting supply of power to the motor at times when the motor temperature exceeds the upper temperature limit.

9. A method according to claim 8, further comprising:

determining that a fault condition exists, as compared to a stall condition, when the motor temperature exceeds the upper temperature limit and the rate of motor temperature change does not exceed the reference rate; and providing, when a fault condition is determined to exist, an electronic representation of the existence of the fault condition.

10. A method according to claim 7, wherein the predetermined state includes the condition of motor temperature exceeding an upper limit, and wherein:

limiting the supply includes limiting supply of power to the motor at times when the motor temperature exceeds the upper temperature limit.

11. A method according to claim 7, wherein:

limiting the supply of power to the motor includes completely shutting off supply of power to the motor when the predetermined state is matched.

12. A motor control system, comprising:

a supply of power;

a motor having windings, the motor being operatively coupled to the supply of power;

power switching between the supply of power and the motor, the power switching selectively cutting-off the supply of power to the motor;

a thermocouple in the windings of the motor, the thermocouple producing an electronic indication of motor temperature;

a rate detector that receives the electronic indication of motor temperature and computes a rate of motor temperature change;

a stall latch operatively coupled to the rate detector, the stall latch providing a stall signal when the rate of motor temperature change exceeds a predetermined amount; and an upper temperature limit comparator that receives the electronic indication of motor temperature and compares it with a predetermined limit, to provide a hot signal when motor temperature exceeds the limit;

wherein the switching is operatively coupled to the stall latch and the upper temperature limit comparator, and cuts-off supply of power to the motor in response to one of the stall signal and the hot signal.

13. A system according to claim 12, further comprising:

reset means for resetting the stall latch only once motor drive has been first removed by an operator and then re-applied.

* * * * *